United States Patent
Miao (10) Patent No.: US 11,099,856 B2
(45) Date of Patent: Aug. 24, 2021

(54) METHODS FOR UNINSTALLING SSD (SOLID-STATE DISK) CARDS AND APPARATUSES USING THE SAME

(71) Applicant: Shannon Systems Ltd., Shanghai (CN)

(72) Inventor: Ningzhong Miao, Shanghai (CN)

(73) Assignee: SHANNON SYSTEMS LTD., Shanghai (CN)

(*) Notice: Subject to any disclaimer, the term of this patent is extended or adjusted under 35 U.S.C. 154(b) by 262 days.

(21) Appl. No.: 15/865,494

(22) Filed: Jan. 9, 2018

(65) Prior Publication Data
US 2018/0307500 A1     Oct. 25, 2018

(30) Foreign Application Priority Data
Apr. 24, 2017  (CN) .......................... 201710270323.6

(51) Int. Cl.
*G06F 9/4401* (2018.01)
*G06F 9/50* (2006.01)
(Continued)

(52) U.S. Cl.
CPC .......... *G06F 9/4411* (2013.01); *G06F 3/0605* (2013.01); *G06F 3/0634* (2013.01);
(Continued)

(58) Field of Classification Search
CPC .... G06F 9/4411; G06F 9/5016; G06F 3/0659; G06F 13/4022; G06F 2213/0026; G06F 3/0605; G06F 3/0679
(Continued)

(56) References Cited

U.S. PATENT DOCUMENTS 6,128,675 A  * 10/2000  Ko .......................... G06F 3/0613
                                                                710/23
8,782,317 B1 *  7/2014  Du .......................... G06F 13/385
                                                                710/311
(Continued)

FOREIGN PATENT DOCUMENTS

CN          100490273 C       5/2009
CN          101604266 A      12/2009
(Continued)

OTHER PUBLICATIONS

"PCI/PCIe基础 ——配置空间 ;" https://blog.csdn.net/jiangwei0512/articlel/details/51603525; Jun. 2016; pp. 1-13.
(Continued)

*Primary Examiner* — Idriss N Alrobaye
*Assistant Examiner* — Brooke J Taylor
(74) *Attorney, Agent, or Firm* — McClure, Qualey & Rodack, LLP (57) ABSTRACT

The invention introduces a method for uninstalling SSD (Solid-state Disk) cards, performed by a processing unit when loading and executing a driver, including at least the following steps: reading the value of the register of an SSD card on which there is an access attempt according to a data access command in the time period between reception of the data access command from an application and transmission of a data access request corresponding to the data access command to lower layers; and executing an uninstall procedure when detecting that the SSD card has been removed according to a result of the reading.

15 Claims, 5 Drawing Sheets

(51) Int. Cl.
*G06F 13/40* (2006.01)
*G06F 3/06* (2006.01)

(52) U.S. Cl.
CPC .......... *G06F 3/0659* (2013.01); *G06F 3/0679* (2013.01); *G06F 9/5016* (2013.01); *G06F 13/4022* (2013.01); *G06F 2213/0026* (2013.01)

(58) Field of Classification Search
USPC ................................................ 710/301, 302
See application file for complete search history.

(56) References Cited

U.S. PATENT DOCUMENTS

| | | | |
|---|---|---|---|
| 9,703,744 B2 * | 7/2017 | Tanaka | .................. G06F 13/385 |
| 2007/0156942 A1 * | 7/2007 | Gough | ................ G06F 13/4081 710/302 |
| 2008/0005439 A1 * | 1/2008 | Matsukuma | ........ G06F 13/4081 710/302 |
| 2009/0198884 A1 | 8/2009 | Mehler et al. | |
| 2016/0179735 A1 * | 6/2016 | Zou | ..................... G06F 13/4081 710/302 |

FOREIGN PATENT DOCUMENTS

| | | |
|---|---|---|
| CN | 103797469 A | 5/2014 |
| CN | 104035728 A | 9/2014 |
| EP | 2 829 986 A1 | 1/2015 |
| TW | 200825743 A | 6/2008 |

OTHER PUBLICATIONS

English language translation of "PCI/PCIe基础 ——配置空间"; Jun. 2016; pp. 1-13.

* cited by examiner

| Field | Offset |
|---|---|
| Device ID 513 \| Vendor ID 511 | 00h |
| Status 523 \| Command 521 | 04h |
| Class Code 533 \| Revision ID 531 | 08h |
| BIST 547 \| Header Type 545 \| Master Latency Timer 543 \| Cache Line Size 541 | 0Ch |

FIG. 5

METHODS FOR UNINSTALLING SSD (SOLID-STATE DISK) CARDS AND APPARATUSES USING THE SAME

CROSS REFERENCE TO RELATED APPLICATIONS

This application claims priority of China Patent Application No. 201710270323.6, filed on Apr. 24, 2017, the entirety of which is incorporated by reference herein.

BACKGROUND

Technical Field

The present invention relates to I/O (input/output) device handling, and in particular to methods for uninstalling SSD (Solid-state Disk) cards and apparatuses using the same.

Description of the Related Art

An SSD (solid-state disk) is a solid-state storage device that uses integrated circuit assemblies as memory to store data persistently. SSD technology primarily uses electronic interfaces compatible with traditional I/O (input/output) HDDs (hard disk drives), which permit simple replacements in common applications. Additionally, new I/O interfaces, like PCI-E and U.2 have been designed to address the specific requirements of SSD technology. When an SSD card is connected to a system, the system allocates computational resources, such as memory space, for the SSD card. When the SSD card is uninstalled, the system needs to execute an uninstall procedure to release the allocated computational resources. However, when the SSD card has been physically removed from the system but the removal has not been detected by the system, the allocated computational resources cannot be released, resulting in waste. Accordingly, what is needed are methods for uninstalling SSD cards and apparatuses using the same to address the aforementioned problems.

BRIEF SUMMARY

An embodiment of the invention introduces a method for uninstalling SSD (Solid-state Disk) cards, performed by a processing unit when loading and executing a driver, including at least the following steps: reading a value of a register of an SSD card on which there is an access attempt according to a data access command in a time period between reception of the data access command from an application and transmission of a data access request corresponding to the data access command to lower layers; and executing an uninstall procedure when detecting that the SSD card has been removed according to a result of the reading.

An embodiment of the invention introduces an apparatus for uninstalling SSD cards at least containing: a root complex device; and a processing unit. The processing unit, coupled to the root complex device, loads and executes a driver to read a value of a register of an SSD card on which there is an access attempt according to a data access command in a time period between reception of the data access command from an application and transmission of a data access request corresponding to the data access command to lower layers; and execute an uninstall procedure when detecting that the SSD card has been removed according to a result of the reading.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
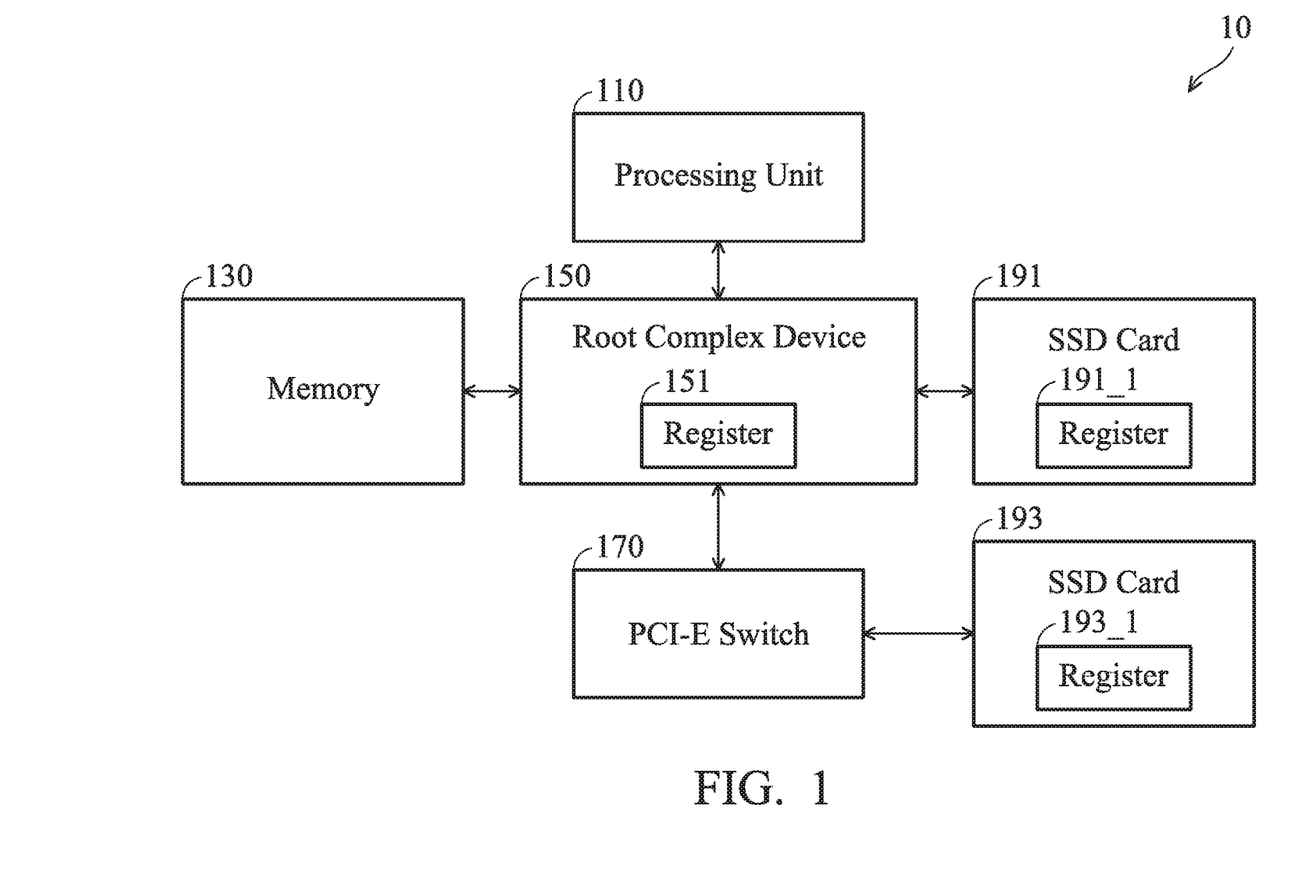
FIG. 1 is the system architecture of a computation apparatus according to an embodiment of the invention.

FIG. 1 is the system architecture of a computation apparatus according to an embodiment of the invention. The system architecture 10 of the computation apparatus contains a processing unit 110, a memory 130, a root complex device 150 and a PCI-E switch 170. The processing unit 110 can be implemented in numerous ways, such as with dedicated hardware, or with general-purpose hardware (e.g., a single processor, multiple processors or graphics processing units capable of parallel computations, etc.) that is programmed using microcode or software instructions to perform the functions recited herein. The processing unit 110 may contain at least an ALU (Arithmetic and Logic Unit) and a shifter. The ALU is responsible for performing Boolean operations (such as AND, OR, NOT, NAND, NOR, XOR, XNOR etc.) and also for performing integer or floating-point addition, subtraction, multiplication, division, etc. The bit shifter is responsible for bitwise shifts and rotations. The root complex device 150 may conform to PCI-E (Peripheral Component Interconnect Express). The root complex device 150 connects the processing unit 110 and the memory 130 to the PCI-E switch 170 composed of one or more switch devices. The root complex device 150 may generate transaction requests on behalf of the processing unit 110, which is interconnected through a local bus. Root complex functionality may be implemented as a dedicated device, or may be integrated with the processing unit 110. The root complex device 150 may contain more than one PCI-E or U.2 port and the PCI-E or U.2 port is disposed on a mother board. The U.2 port is a variation of the PCI-E port. Both the two types of ports follow PCI-E specification but have different appearance. Typically, the U.2 ports support the hot-plug but most of the PCI-E ports do not support that. The mother board additionally installs the processing unit 110, the memory 130, a northbridge chip (not shown), a southbridge chip (not shown) and the root complex device 150. An SSD (solid-state disk) card 191 is connected to one PCI-E or U.2 port on the root complex device 150 and an SSD card 193 is concatenatively connected to one PCI-E or U.2 port on the root complex device 150 through the PCI-E switch 170. Any SSD card being connected to the PCI-E port may be referred to as a PCI-E SSD card while any SSD card being connected to the U.2 port may be referred to as an U.2 SSD card. When the SSD 191 or 193 is connected to the root complex device 150, memory 130 may allocate space for the connected SSD card for I/O buffers, constants, variables and so on, that are required in manipulating the connected SSD card.

Figure 2:
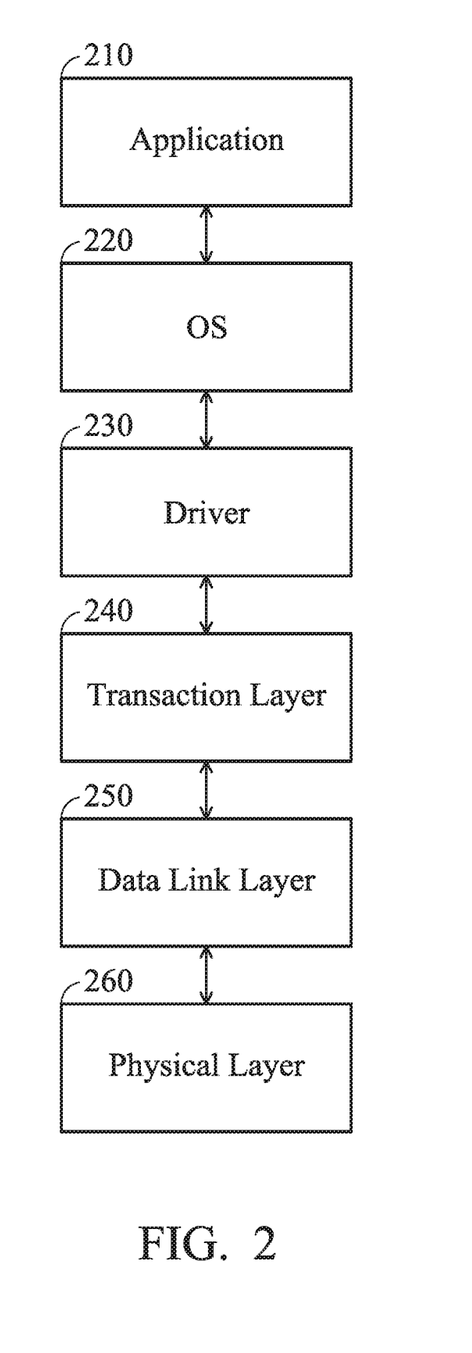
FIG. 2 is a schematic diagram illustrating layers of PCI-E (Peripheral Component Interconnect Express) according to an embodiment of the invention.

FIG. 2 is a schematic diagram illustrating layers of PCI-E according to an embodiment of the invention. An application 210 reads data from a designated address of the SSD card 191 or 193 or writes data into a designated address of the SSD card 191 or 193 through an OS (Operating System) 220. The OS 220 sends commands to a driver 230 and the driver 230 generates and sends a corresponding read or write request to a transaction layer 240 accordingly. The transaction layer 240 employs the split-transaction protocol in the packet architecture to the SSD card 191 or 193 through a data link layer 250 and a physical layer 260.

Figure 3:
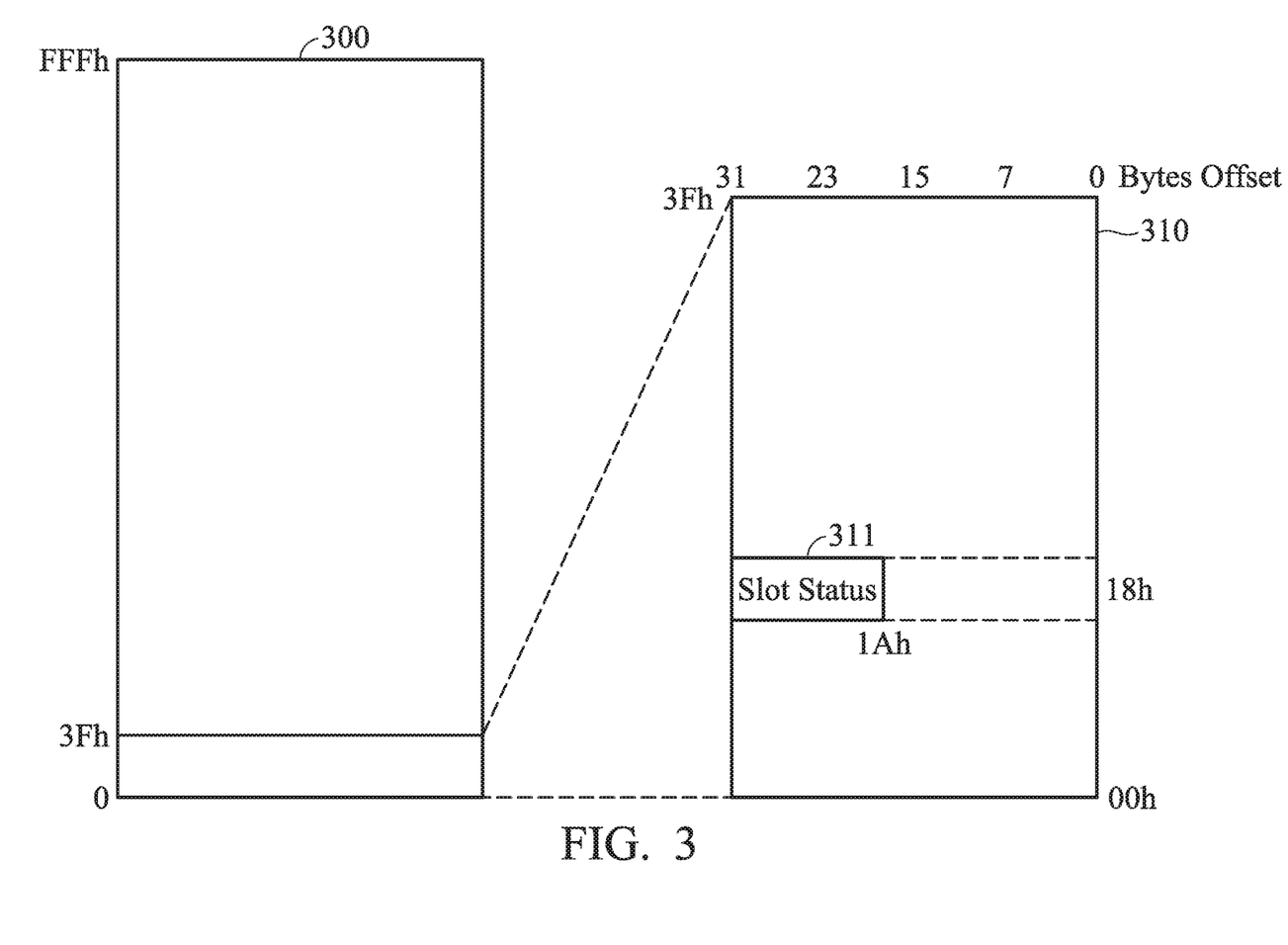
FIG. 3 is a schematic diagram illustrating a capacity structure according to an embodiment of the invention.

The root complex device 150 may contain a register 151 for storing a capacity structure for each PCI-E or U.2 SSD card. FIG. 3 is a schematic diagram illustrating a capacity structure according to an embodiment of the invention. The capacity structure 300 may be 4096 bits and allows identification of an SSD card and indicates support for new PCI-E features. The capacity structure may contain a PCI header 310 (bytes 0h-3Fh). Bytes 1Ah and 1Bh of the PCI header 310 store a slot status 311. The slot status 311 includes information in 2 bytes (i.e. 16 bits). Exemplary information of the slot status 311 is shown in Table 1 as follows:

TABLE 1

| Bit | Description |
| --- | --- |
| 0 | If attention button is pressed |
| 1 | If power fault is detected |
| 2 | If MRL sensor state has changed |
| 3 | If Presence Detect State has changed; "1b" indicates a change |
| 4 | If hot-plug command is complete |
| 5 | A MRL sensor state |
| 6 | Presence Detect State; "0b" indicates an empty slot; "1b" indicates that a card is inserted |
| 7 | Electromechanical interlock state |
| 8 | If data link layer state has changed |

In some embodiments, the processing unit 110 may execute a daemon to periodically detect one of the $3^{rd}$ bit and the $6^{th}$ bit of the slot state 311 through the driver 230 to know if the SSD card 191 or 193 is inserted in the port and connected to the root complex device 150. In a multitasking OS, a daemon is a computer program that runs as a background task after system booting, rather than being under the direct control of a user. When the daemon detects that any of the SSD cards 191 and 193 has removed from the port and disconnected from the mother board, an uninstall procedure is executed to release computer resources associated with the removed SSD card, such as the allocated space of the memory 130, and to delete the entity of the removed SSD card from the device model to avoid an application to access the removed SSD card. Each of the processing units (not shown) of the SSD cards 191 and 193 may execute a hot-plug procedure. The hot-plug procedure may change the $3^{rd}$ bit and the $6^{th}$ bit of the slot state 311 to notify the daemon when the SSD card is going to be removed from the port and disconnected from the mother board. However, if the hot-plug procedure does not follow the specification to change the $3^{rd}$ bit and the $6^{th}$ bit of the slot state 311 when the SSD card is going to be removed from the port and disconnected from the mother board, the computer resources associated with the SSD card to be removed cannot be released, resulting in a waste and a mistake of including the removed SSD card in the device model after the SSD card is removed.

Figure 4:
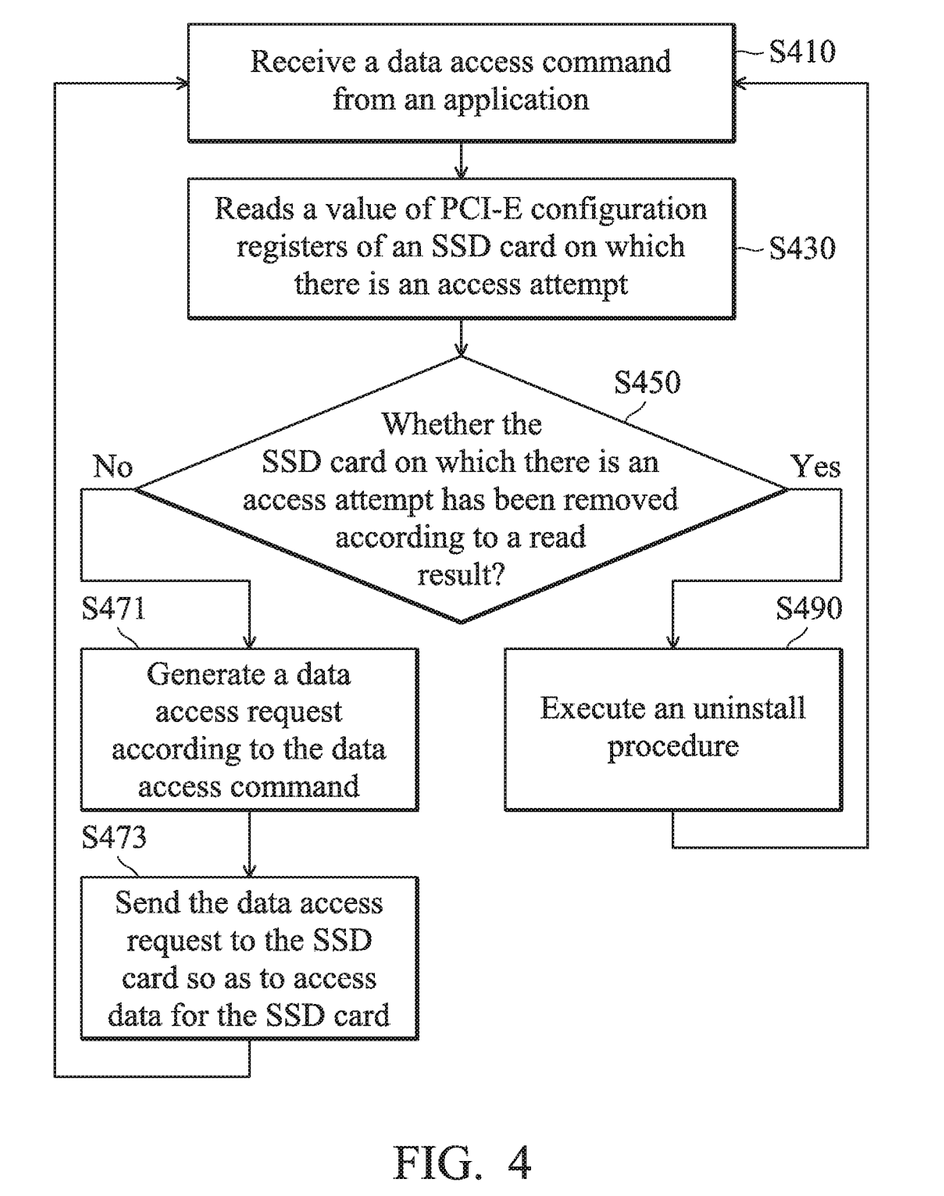
FIG. 4 is a flowchart illustrating a method for uninstalling an SSD card according to an embodiment of the invention.
Figure 5:
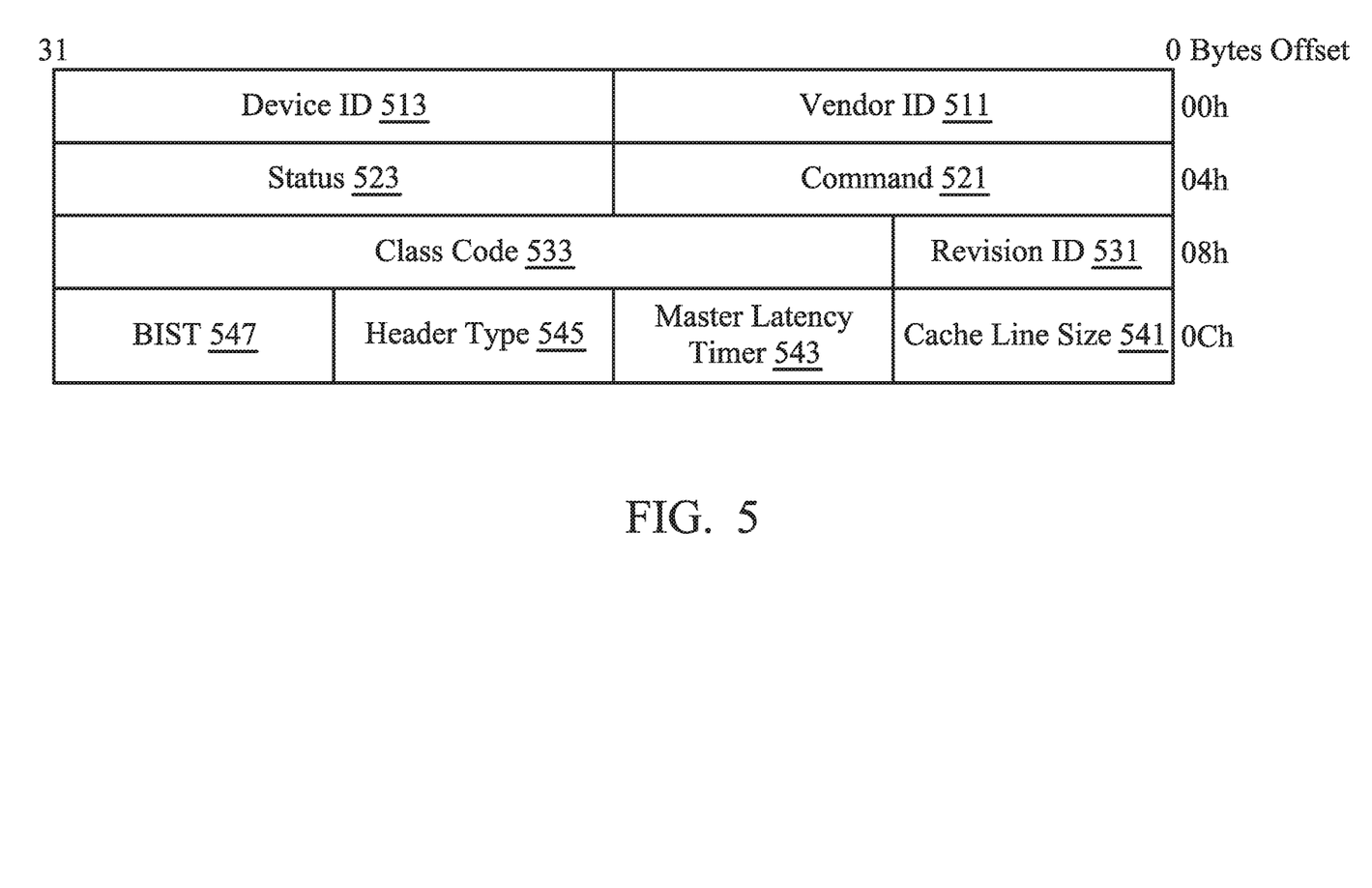
FIG. 5 is a schematic diagram of a header of common configuration space stored in PCI-E configuration registers according to an embodiment of the invention.

To address the aforementioned drawbacks, the driver 230 may read the value of a register of the SSD card on which there is an access attempt according to a data access command in the time period between reception of the data access command from the application and transmission of a data access request corresponding to the data access command to lower layers. It should be noted that the time period excludes the transmission of the data access request corresponding to the data access command to the lower layers. In some embodiments, the lower layers include the transaction layer 240, the data link layer 250 and the physical layer 260. In some embodiments, the value of the register of the SSD card is a value of PCI-E configuration registers. The driver 230 executes the uninstall procedure when detecting that this SSD card has been removed according to the results of the previous reading. A removed SSD indicates that the SSD card is removed from the PCI-E or U.2 port on the mother board and uncoupled from the root complex device 150. FIG. 4 is a flowchart illustrating a method for uninstalling an SSD card according to an embodiment of the invention. The method is performed when the processing unit 110 loads and executes the driver 230. After receiving a data access command from an application (step S410), the processing unit 110 reads a value of PCI-E configuration registers of an SSD card on which there is an access attempt according to the data access command (step S430). For example, the data access command may instruct the driver 230 to read data of a range of LBAs (Logical Block Addresses) from the SSD card 191, delete data of a range of LBAs from the SSD card 191 or update data of a range of LBAs of the SSD card 191, or others. When receiving the above command, the driver 230 reads a value of the PCI-E configuration registers 191_1 of the SSD card 191. FIG. 5 is a schematic diagram of a header of common configuration space stored in PCI-E configuration registers according to an embodiment of the invention. In some embodiments, the driver 230 may read a value of a vendor ID 511 of 2 bytes starting from the offset 00h. When the SSD card has been removed, the driver 230 receives a value of "FFFFh". In some embodiments, the driver 230 may read a value of a device ID 513 of 2 bytes starting from the offset 02h. When the SSD card has been removed, the driver 230 receives a value of "FFFFh". In some embodiments, the driver 230 may read a value of a command 521 of 2 bytes starting from the offset 04h. When the SSD card has been removed, the driver 230 receives a value of "FFFFh". In some embodiments, the driver 230 may read a value of a status 523 of 2 bytes starting from the offset 06h. When the SSD card has been removed, the driver 230 receives a value of "FFFFh". In some embodiments, the driver 230 may read a value of a revision ID 531 of 1 byte starting from the offset 08h. When the SSD card has been removed, the driver 230 receives a value of "FFh". In some embodiments, the driver 230 may read a value of a class code 533 of 3 byte starting from the offset 09h. When the SSD card has been removed, the driver 230 receives a value of "FFFFFFh". In some embodiments, the driver 230 may read a value of a cache line size 541 of 1 byte starting from the offset 0Ch. When the SSD card has been removed, the driver 230 receives a value of "FFh". In some embodiments, the driver 230 may read a value of a master latency timer 543 of 1 byte starting from the offset 0Dh. When the SSD card has been removed, the driver 230 receives a value of "FFh". In some embodiments, the driver 230 may read a value of a header type 545 of 1 byte starting from the offset 0Eh. When the SSD card has been removed, the driver 230 receives a value of "FFh" In some embodiments, the driver 230 may read a value of a BIST (Built-In Self Test) 547 of 1 byte starting from the offset 0Fh. When the SSD card has been removed, the driver 230 receives a value of "FFh". Subsequently, the driver 230 determines whether the SSD card on which there is an access attempt has been removed according to a read result (step S450). Specifically, when each of the byte(s) of the value is "FFh", it is determined that the SSD card on which there is an access attempt has been removed. When any of the byte(s) of the value is not "FFh", it is determined that the SSD card on which there is an access attempt has not been removed. When the SSD card on which there is an access attempt has not been removed (the "No" path of step S450), a data access request is generated according to the data access command (step S471), the data access request is sent to the SSD card through the transaction layer 240, the data link layer 250 and the physical layer 260 so as to access data for the SSD card (step S473). When the SSD card on which there is an access attempt has been removed (the "Yes" path of step S450), the uninstall procedure is executed (step S490).

Although the embodiment has been described as having specific elements in FIG. 1, it should be noted that additional elements may be included to achieve better performance without departing from the spirit of the invention. While the process flow described in FIG. 4 includes a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for uninstalling SSD (Solid-state Disk) cards, performed by a processing unit when loading and executing a driver, comprising:

reading a value of a register of an SSD card on which there is an access attempt according to a data access command, wherein reading the value of the register occurs in a time period between reception of the data access command from an application and transmission of a data access request corresponding to the data access command to a transaction layer, a data link layer or a physical layer; and executing an uninstall procedure when detecting that the SSD card has been removed according to a result of the reading;

wherein the value is composed of n bytes, wherein it is determined that the SSD card has been removed when each of n bytes of the result is "FFh".

2. The method of claim 1, wherein the register is a PCI-E (Peripheral Component Interconnect Express) configuration register.

3. The method of claim 2, wherein the value of the register is a vendor ID, a device ID, a command, a status, a revision ID, a class code, a cache line size, a master latency, a header type, or a BIST (Built-In Self Test) of a configuration space header.

4. The method of claim 1, comprising:

generating the data access request according to the data access command and transmitting the data access request to the lower layers when detecting that the SSD card has not been removed according to the results of the reading.

5. The method of claim 4, wherein the register stores the value is composed of n bytes, and it is determined that the SSD card has not been removed when any of the n bytes of the result is not "FFh".

6. The method of claim 1, wherein when the uninstall procedure is being executed, the processing unit releases computer resources associated with the removed SSD card and deletes an entity of the removed SSD card from a device model.

7. The method of claim 6, wherein the computer resources comprise allocated space of a memory.

8. An apparatus for uninstalling SSD (Solid-state Disk) cards, comprising:

a root complex device; and a processing unit, coupled to the root complex device, loading and executing a driver to read a value of a register of an SSD card on which there is an access attempt according to a data access command, wherein reading the value of the register occurs in a time period between reception of the data access command from an application and transmission of a data access request corresponding to the data access command to a transaction layer, a data link layer or a physical layer; and execute an uninstall procedure when detecting that the SSD card has been removed according to a result of the reading;

wherein the value is composed of n bytes, wherein the processing unit determines that the SSD card has been removed when each of n bytes of the result is "FFh".

9. The apparatus of claim 8, wherein the register is a PCI-E (Peripheral Component Interconnect Express) configuration register.

10. The apparatus of claim 9, wherein the value of the register is a vendor ID, a device ID, a command, a status, a revision ID, a class code, a cache line size, a master latency, a header type or a BIST (Built-In Self Test) of a configuration space header.

11. The apparatus of claim 8, wherein the processing unit generates the data access request according to the data access command and transmits the data access request to the lower layers when detecting that the SSD card has not been removed according to the results of the reading.

12. The apparatus of claim 11, wherein the register stores the value of n bytes, and the processing unit determines that the SSD card has not been removed when any of the n bytes of the result is not "FFh".

13. The apparatus of claim 8, wherein when the uninstall procedure is being executed, the processing unit releases computer resources associated with the removed SSD card and deletes an entity of the removed SSD card from a device model.

14. The apparatus of claim 13, wherein the computer resources comprise allocated space of a memory.

15. The method of claim 1, wherein the uninstall procedure is executed to release computer resources associated with removing the SSD card.

* * * * *